(12) United States Patent
Lin

(10) Patent No.: US 11,973,600 B2
(45) Date of Patent: Apr. 30, 2024

(54) METHOD FOR MULTIPLEXING FEEDBACK RESOURCES, TERMINAL DEVICE AND NETWORK DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 435 days.

(21) Appl. No.: 17/197,450

(22) Filed: Mar. 10, 2021

(65) Prior Publication Data
US 2021/0203452 A1    Jul. 1, 2021

Related U.S. Application Data

(63) Continuation of application No. PCT/CN2018/107424, filed on Sep. 25, 2018.

(51) Int. Cl.
*H04L 1/1812* (2023.01)
*H04L 1/1829* (2023.01)
(Continued)

(52) U.S. Cl.
CPC .......... *H04L 1/1819* (2013.01); *H04L 1/1854* (2013.01); *H04L 1/1896* (2013.01); *H04W 72/0446* (2013.01); *H04W 72/23* (2023.01)

(58) Field of Classification Search
None
See application file for complete search history.

(56) References Cited

U.S. PATENT DOCUMENTS

2011/0268048 A1* 11/2011 Toskala ............... H04L 1/16
714/748
2012/0057487 A1    3/2012 Ahn et al.
(Continued)

FOREIGN PATENT DOCUMENTS

CN    101771502 A    7/2010
CN    103095433 A    5/2013
(Continued)

OTHER PUBLICATIONS

EPO, Extended European Search Report for European Application No. 18935747.8, dated Jul. 28, 2021. 11 pages.
(Continued)

*Primary Examiner* — Anh Vu H Ly
(74) *Attorney, Agent, or Firm* — PERKINS COIE LLP

(57) ABSTRACT

Disclosed in the present disclosure are a method for multiplexing on a feedback resource, a terminal device, a network device, a chip, a computer readable storage medium, a computer program product and a computer program, the method comprising: determining a granularity for multiplexing feedback information; the granularity for multiplexing being used for characterizing the time domain range of a multiplexing window for multiplexing the feedback information, and being used for multiplexing the feedback information of at least two downlink transmissions on the same feedback resource in the multiplexing window; and the time domain range being one of the following: a complete time slot, a non-complete time slot, or N symbols, N being an integer greater than or equal to 1.

17 Claims, 5 Drawing Sheets

---

A granularity for multiplexing feedback information is determined, wherein the granularity for multiplexing is used for representing a time domain range of a multiplexing window for multiplexing the feedback information and for multiplexing feedback information of at least two downlink transmissions on a same feedback resource in the multiplexing window; the time domain range is one of a slot, partial of a slot or N symbols, with N being an integer greater than or equal to 1 — 901

Determining that a terminal device transmits multiplexed feedback information of at least two downlink transmissions on the same feedback resource in the multiplexing window based on the granularity for multiplexing the feedback information — 902

(51) Int. Cl.
*H04L 1/1867* (2023.01)
*H04W 72/0446* (2023.01)
*H04W 72/23* (2023.01)

(56) References Cited

U.S. PATENT DOCUMENTS

| | | | | |
|---|---|---|---|---|
| 2015/0271839 A1* | 9/2015 | She | .................. | H04L 1/1864 370/329 |
| 2019/0103947 A1* | 4/2019 | Park | .................. | H04L 1/1861 |
| 2019/0159251 A1* | 5/2019 | Li | .................. | H04L 1/18 |
| 2019/0342037 A1* | 11/2019 | Karaki | .................. | H04W 72/04 |
| 2020/0015229 A1* | 1/2020 | Yang | .................. | H04W 76/15 |
| 2020/0036480 A1* | 1/2020 | Yang | .................. | H04B 7/0645 |
| 2020/0067678 A1 | 2/2020 | Zhou et al. | | |
| 2020/0213044 A1* | 7/2020 | Peng | .................. | H04L 1/1864 |
| 2020/0389262 A1 | 12/2020 | Oh et al. | | |
| 2021/0195628 A1* | 6/2021 | Lin | .................. | H04W 72/0446 |
| 2022/0376873 A1* | 11/2022 | Lei | .................. | H04L 1/1864 |

FOREIGN PATENT DOCUMENTS

| | | |
|---|---|---|
| CN | 108401488 A | 8/2018 |
| JP | 2017533653 A | 11/2017 |
| KR | 20180018286 A | 2/2018 |
| TW | 201743635 A | 12/2017 |
| WO | 2017155594 A1 | 9/2017 |
| WO | 2018086071 A1 | 5/2018 |
| WO | 2018124029 A1 | 7/2018 |
| WO | 2018128474 A1 | 7/2018 |

OTHER PUBLICATIONS

NTT Docomo, Inc. "Views on UCI on sPUSCH" R1-1702786; 3GPP TSG RAN WG1 Meeting #88; Feb. 13-17, 2017. 5 pages.
Samsung "HARQ Management and Feedback" R1-1712034; 3GPP TSG RAN WG1 Meeting 91; Nov. 27-Dec. 1, 2017. 8 pages.
Decision of Refusal for Japanese Application No. 2021-540345 dated Mar. 17, 2023. 6 pages with English translation.
Decision of Refusal for Taiwanese Application No. 108133869 dated Mar. 3, 2023. 3 pages with English translation.
Examination Report for European Application No. 18935747.8 dated Jan. 27, 2023. 7 pages.
3GPP TSG-RAN WG1 Meeting #94—R1-1808574—Gothenburg, Sweden, Aug. 20-24, 2018—Nokia, Nokia Shanghai Bell, On enhanced HARQ-ACK feedback for URLLC (2 pages).
International Search Report dated Jun. 24, 2019 of PCT/CN2018/107424 (4 pages).
Notice of Reasons for Refusal for Japanese Application No. 2021-540345 dated Aug. 26, 2022. 8 pages with English translation.
Office Action for Taiwanese Application No. 108133869 dated Nov. 7, 2022. 12 pages with English translation.
Examination Report for Indian Application No. 202117011098 dated Feb. 8, 2022. 8 pages with English translation.
Notice of Termination of Reconsideration by Examiners before Appeal Proceedings of the Japanese application No. 2021-540345, issued on Sep. 26, 2023. 2 pages with English translation.
Reconsideration Report by Examiner before Appeal of the Japanese application No. 2021-540345, issued on Sep. 26, 2023. 5 pages with English translation.
Reason of Rejection of the Japanese application No. 2021-540345, issued on Mar. 8, 2024. 12 pages with English translation.

* cited by examiner

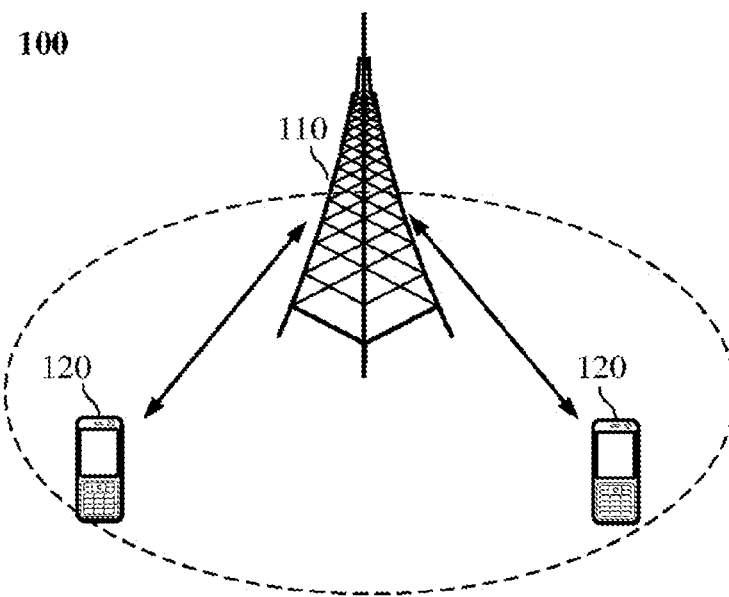

FIG. 1

A granularity for multiplexing feedback information is determined , wherein the granularity for multiplexing is used for representing a time domain range of a multiplexing window for multiplexing the feedback information and for multiplexing feedback information of at least two downlink transmissions on a same feedback resource in the multiplexing window ; the time domain range is one of a slot , partial of a slot or N symbols, with N being an integer greater than or equal to 1     201

FIG. 2

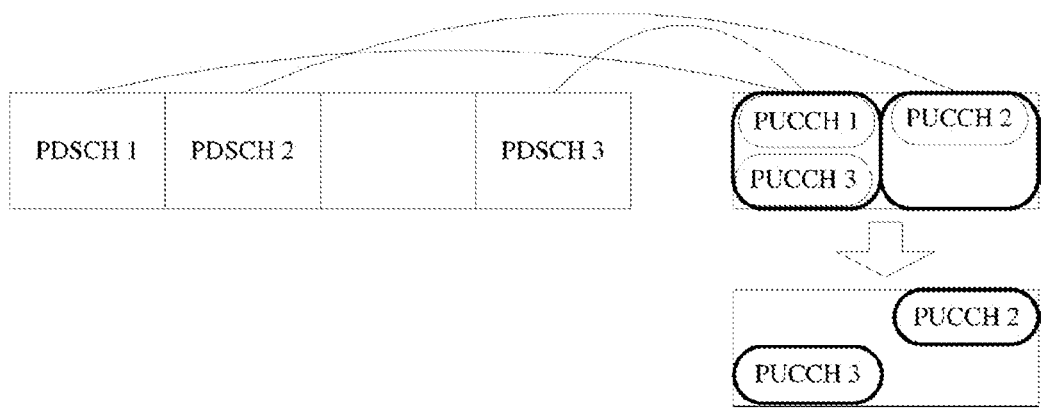

FIG. 6
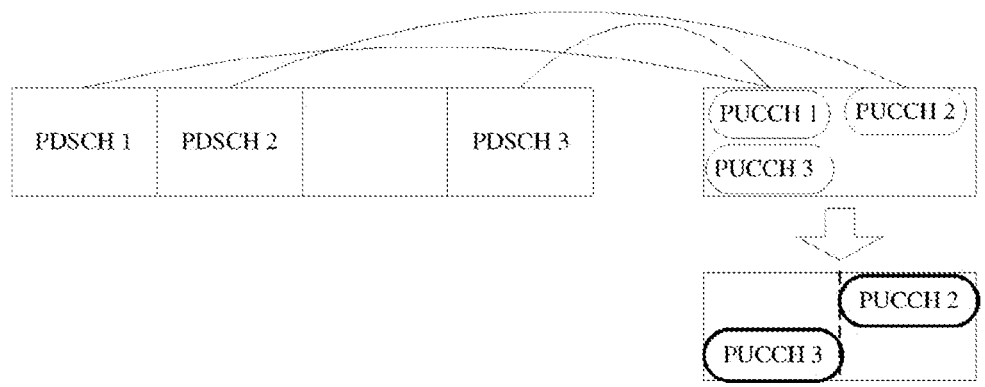
FIG. 7
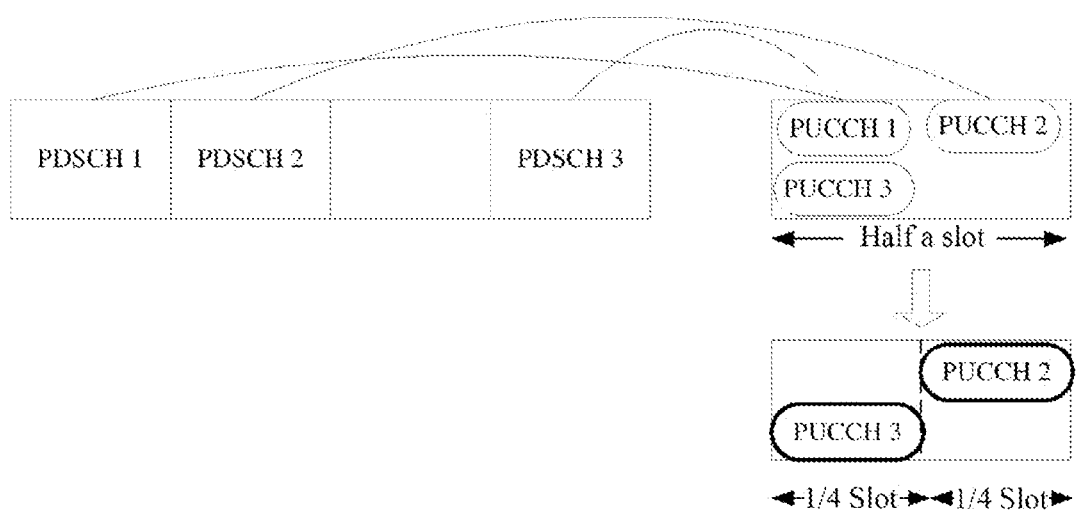
FIG. 8

METHOD FOR MULTIPLEXING FEEDBACK RESOURCES, TERMINAL DEVICE AND NETWORK DEVICE

CROSS-REFERENCE TO RELATED APPLICATION

This application is a continuation application of International PCT Application No. PCT/CN2018/107424 filed on Sep. 25, 2018, the entire content of which is hereby incorporated by reference.

TECHNICAL FIELD

The present disclosure relates to the technical field of information processing, in particularly to a method for multiplexing on a feedback resource, a terminal device, a network device, a chip, a computer readable storage medium, a computer program product and a computer program.

BACKGROUND

In the new radio (NR) Rel (Release)-15, a base station indicates transmission of feedback information corresponding to downlink control information (DCI) or a physical downlink shared channel (PDSCH) scheduled by the DCI, such as a slot for an acknowledgement (ACK)/non-acknowledgement (NACK), through downlink scheduling signaling, such as a PDSCH-to-hybrid automatic repeat request (HARQ) feedback timing indicator information field in the DCI. For example, if the DCI or the PDSCH scheduled by the DCI is transmitted in slot n, the corresponding ACK/NACK will be transmitted in slot n+k. The PDSCH-to-HARQ_feedback timing indicator is used for indicating a value of k. However, for services sensitive to transmission latency, the current feedback time may not meet latency requirements.

SUMMARY

Implementations of the present disclosure provide a method for multiplexing on a feedback resource, a terminal device, a network device, a chip, a computer readable storage medium, a computer program product and a computer program.

In a first aspect, an implementation of the present disclosure provides a method for multiplexing on a feedback resource, which is applied to a terminal device and includes:

determining a granularity for multiplexing feedback information, wherein the granularity for multiplexing is used for representing a time domain range of a multiplexing window for multiplexing the feedback information and for multiplexing feedback information of at least two downlink transmissions on a same feedback resource in the multiplexing window; the time domain range is one of: a slot, partial of a slot or N symbols, with N being an integer greater than or equal to 1.

In a second aspect, an implementation of the present disclosure provides a method for multiplexing on a feedback resource, which is applied to a network device and includes:

determining a granularity for multiplexing feedback information, wherein the granularity for multiplexing is used for representing a time domain range of a multiplexing window for multiplexing the feedback information and for multiplexing feedback information of at least two downlink transmissions on a same feedback resource in the multiplexing window; the time domain range is one of: a slot, partial of a slot or N symbols, with N being an integer greater than or equal to 1; and determining that a terminal device transmits multiplexed feedback information of at least two downlink transmissions on the same feedback resource in the multiplexing window based on the granularity for multiplexing the feedback information.

In a third aspect, an implementation of the present disclosure provides a terminal device including:

a first processing unit configured to determine a granularity for multiplexing feedback information, wherein the granularity for multiplexing is used for representing a time domain range of a multiplexing window for multiplexing the feedback information and for multiplexing on the same feedback resource in the multiplexing window for feedback information of at least two downlink transmissions; the time domain range is one of: a slot, partial of a slot or N symbols, with N being an integer greater than or equal to 1.

In a fourth aspect, an implementation of the present disclosure provides a network device including:

a second processing unit configured to determine a granularity for multiplexing feedback information, wherein the granularity for multiplexing is used for representing a time domain range of a multiplexing window for multiplexing the feedback information and for multiplexing on the same feedback resource in the multiplexing window for feedback information of at least two downlink transmissions; the time domain range is one of: a slot, partial of a slot or N symbols, with N being an integer greater than or equal to 1; and determining that a terminal device transmits multiplexed feedback information of the at least downlink transmissions on the same feedback resource in the multiplexing window based on the granularity for multiplexing the feedback information.

In a fifth aspect, there is provided a terminal device including a processor and a memory. The memory is configured to store a computer program, and the processor is configured to call and run the computer program stored in the memory to execute the method according to the first aspect described above and various implementations thereof.

In a sixth aspect, there is provided a network device including a processor and a memory. The memory is configured to store a computer program, and the processor is configured to call and run the computer program stored in the memory to execute the method according to the second aspect described above and various implementations thereof.

In a seventh aspect, there is provided a chip for implementing the method according to any one of the first and second aspects described above and various implementations thereof.

Specifically, the chip includes a processor configured to call and run a computer program from a memory, so that a device having the chip installed thereon executes the method according to any one of the first and second aspects described above and various implementations thereof.

In an eighth aspect, there is provided a computer readable storage medium configured to store a computer program that causes a computer to execute the method according to any one of the first and second aspects described above and various implementations thereof.

In a ninth aspect, there is provided a computer program product including computer program instructions that cause a computer to execute the method according to any one of the first and second aspects described above and various implementations thereof.

In a tenth aspect, there is provided a computer program, which, when being run on a computer, causes a computer to execute the method according to any one of the first and second aspects described above and various implementations thereof.

BRIEF DESCRIPTION OF DRAWINGS

FIG. 1 is a first schematic diagram of an architecture of a communication system according to an implementation of the present application;

FIG. 2 is a first schematic flowchart of a method for multiplexing on a feedback resource according to an implementation of the present application;

FIG. 6 is a fourth schematic diagram of a feedback resource multiplexing scenario according to an implementation of the present application;

FIG. 7 is a fifth schematic diagram of a feedback resource multiplexing scenario according to an implementation of the present application;

FIG. 8 is a sixth schematic diagram of a feedback resource multiplexing scenario according to an implementation of the present application;

DETAILED DESCRIPTION

Figure 3:
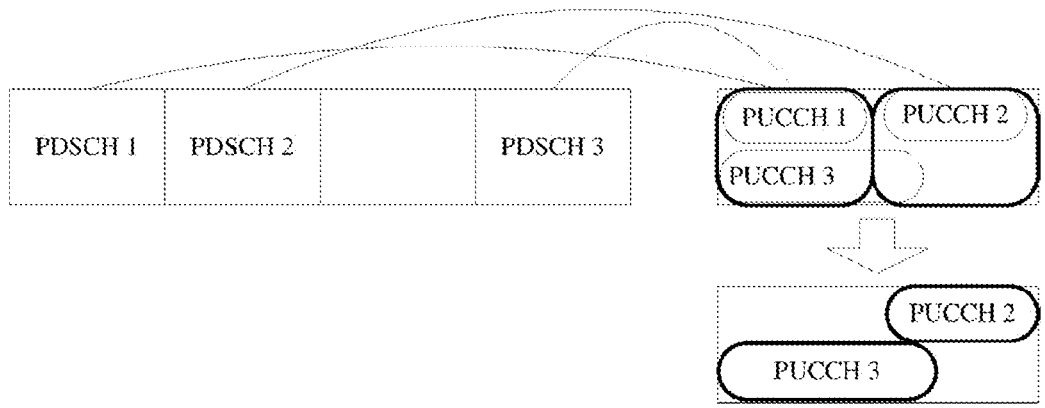
FIG. 3 is a first schematic diagram of a feedback resource multiplexing scenario according to an implementation of the present application.

Technical solutions in implementations of the present application will be described below with reference to the accompanying drawings in the implementations of the present application. It is apparent that the implementations described are just some of the implementations of the present application, but not all of the implementations of the present application. According to the implementations of the present application, all other implementations achieved by a person of ordinary skill in the art without making inventive efforts shall fall within the protection scope of the present application.

The technical solutions in the implementations of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, a LTE Time Division Duplex (TDD) system, a Universal Mobile Telecommunications System (UMTS), a Worldwide Interoperability for Microwave Access (WiMAX) communication system or a 5G system, etc.

Illustratively, a communication system 100 applied in an implementation of the present application is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage range of the network device 110. The "terminal device" as used herein includes, but not limited to, a device configured to be connected via a wired circuit, for example, via a public switched telephone network (PSTN), a digital subscriber line (DSL), a digital cable, a direct cable; and/or another data connection/network; and/or via a wireless interface, for instance, for a cellular network, a wireless local area network (WLAN), a digital television network such as a handheld digital video broadcasting-handheld (DVB-H) network, a satellite network, and an amplitude modulation-frequency modulation (AM-FM) broadcast transmitter; and/or an apparatus of another terminal configured to receive/transmit communication signals; and/or an Internet of Things (IoT) device. A terminal device configured to communicate via a wireless interface may be referred to as "a wireless communication terminal", "a wireless terminal" or "a mobile terminal". Examples of the mobile terminal include, but not limited to, a satellite or cellular phone; a personal communication system (PCS) terminal capable of combining a cellular radio phone with data processing, facsimile, and data communication abilities; a personal digital assistant (PDA) that may include a radio phone, a pager, internet/intranet access, a Web browser, a memo pad, a calendar, a Global Positioning System (GPS) receiver; and a conventional laptop and/or palmtop receiver or other electronic devices including a radio phone transceiver. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal in a 5G network, or a terminal in a future evolved Public Land Mobile Network (PLMN), etc.

Optionally, device to device (D2D) communication may be performed between the terminal devices 120.

Optionally, the 5G system or 5G network may be referred to as a New Radio (NR) system or a NR network.

FIG. 1 illustrates exemplarily one network device and two terminal devices. Optionally, the communication system 100 may include multiple network devices, and other numbers of terminal devices may be included within the coverage range of each network device, which is not limited in the implementations of the present application.

Optionally, the communication system 100 may include other network entities, such as a network controller and a mobile management entity, which is not limited in the implementations of the present application.

It should be understood that a device with a communication function in a network/system in the implementations of the present application may be referred to as a communication device. Taking the communication system 100 shown in FIG. 1 as an example, the communication device may include a network device 110 and terminal devices 120 which have communication functions, and the network device 110 and the terminal devices 120 may be the specific devices described above, which will not be described repeatedly herein. The communication device may also include other devices in the communication system 100, such as other network entities, such as network controllers and mobile management entities, which is not limited in the implementations of the present application.

It should be understood that the terms "system" and "network" are often used interchangeably herein. The term "and/or" herein describes an association relation between associated objects only, indicating that there may be three relations, for example, A and/or B may indicate three cases: A alone, both A and B, and B alone. In addition, the symbol "/" herein generally indicates that there is a "or" relation between the associated objects before and after "/".

In order to understand features and technical contents of the implementations of the present disclosure in more detail, implementation modes of the implementations of the present disclosure will be set forth in detail below with reference to the accompanying drawings, which are for reference only and are not intended to limit the implementations of the present disclosure.

Implementation One

An implementation of the present disclosure provides a method for multiplexing on a feedback resource, which is applied to a terminal device. As shown in FIG. 2, the method includes the following act 201.

In act 201, a granularity for multiplexing feedback information is determined, wherein the granularity for multiplexing is used for representing a time domain range of a multiplexing window for multiplexing the feedback information and for multiplexing feedback information of at least two downlink transmissions on a same feedback resource in the multiplexing window; the time domain range is one of a slot, partial of a slot or N symbols, with N being an integer greater than or equal to 1.

The implementation corresponds to the following several processing scenarios:

Scenario One

That is, the granularity for multiplexing the feedback information is semi-statically configured.

In the above, a high-level signaling may be a RRC signaling. Of course, the granularity for multiplexing the feedback information may be configured through DCI. It should be indicated that if the granularity for multiplexing the feedback information is configured through the DCI, the granularity for multiplexing the feedback information may not need to be contained every time the DCI is sent, while the DCI is sent only when the granularity for multiplexing the feedback information needs to be reconfigured.

The feedback information may be feedback information of downlink transmission, wherein the downlink transmission may be downlink control information (DCI) or a downlink transmission scheduled by the DCI. When the downlink transmission is the downlink transmission scheduled by the DCI, a physical downlink control channel (PDCCH) may refer to information transmitted by a physical downlink shared channel (PDSCH).

The feedback information of downlink transmission may be acknowledgement (ACK)/non-acknowledgement (NACK) information of hybrid automatic repeat request (HARQ). For example, the granularity for multiplexing of the semi-statically configured HARQ-ACK is N symbols.

In this scenario, when the feedback information of at least two downlink transmissions is processed, when the feedback information of the at least two downlink transmissions correspond to a same multiplexing window, the feedback information of the at least two downlink transmissions is multiplexed on the same feedback resource; or when feedback resources for the at least two downlink transmissions are not in the same multiplexing window, the feedback information is transmitted on a corresponding feedback resources respectively.

The feedback information may be multiplexed on the same feedback resource in the same multiplexing window.

In the above, a method for determining whether at least two pieces of feedback information fall in the same multiplexing window can determine whether start points and/or end points of the at least two feedback resources fall in the same multiplexing window. For example, when all the start points and end points of the at least two feedback resources fall in the same multiplexing window, or all the start points of the at least two feedback resources fall in the same multiplexing window, or all the end points of the at least two feedback resources fall in the same multiplexing window.

Further, during the multiplexing, other feedback information except the last scheduled feedback information among the at least two pieces of feedback information can be multiplexed on the feedback resource of the last scheduled feedback information and transmitted.

Scenario Two

Determining the granularity for multiplexing the feedback information further includes determining the granularity for multiplexing the feedback information based on granularity of a feedback timing, wherein the granularity of the feedback timing is one of a slot, partial of a slot or N symbols, with N being an integer greater than or equal to 1.

In the above, the granularity of the feedback timing may be configured by a high-level signaling or preconfigured by the terminal device itself.

The high-level signaling may be a RRC signaling. Of course, the granularity for multiplexing the feedback information may be configured through DCI. It should be indicated if the granularity for multiplexing the feedback information is configured through the DCI, the granularity for multiplexing the feedback information may not need to be contained every time the DCI is sent, and the DCI is sent only when the granularity for multiplexing the feedback information needs to be reconfigured.

The feedback information may be feedback information of downlink transmission, which may be downlink control information (DCI) or a downlink transmission scheduled by the DCI. When the downlink transmission is the downlink transmission scheduled by the DCI, a physical downlink control channel (PDCCH) may refer to information transmitted by a physical downlink shared channel (PDSCH).

The feedback information of downlink transmission may be acknowledgement (ACK)/non-acknowledgement (NACK) information of hybrid automatic repeat request (HARQ). That is, the granularity for multiplexing HARQ-ACK is determined based on HARQ-ACK timing granularity, which is the same as the granularity for multiplexing HARQ-ACK. For a case in which a HARQ-ACK multiplexing windows pointed by HARQ-ACK timing are the same, HARQ-ACK is multiplexed.

Determining the granularity for multiplexing the feedback information includes determining the granularity for multiplexing the feedback information to be the same as the granularity of the feedback timing. That is, the granularity for multiplexing the feedback information is set to be the same as the granularity of the feedback timing.

Specifically, in this method, multiplexing the feedback information of the at least two downlink transmissions on the same feedback resource in the multiplexing windows further includes:

multiplexing the feedback information of the at least two downlink transmissions on the same feedback resource when the feedback information of the at least two downlink transmissions correspond to a same multiplexing window.

For example, as shown in FIG. 3, if the granularity of the feedback timing, such as HARQ timing granularity, is half slot, then the granularity for multiplexing the feedback information, such as a HARQ-ACK multiplexing window, is also half slot. When the downlink transmission is a PDSCH, it is assumed that HARQ-ACK for which the downlink transmission is PDSCH 1 and PDSCH 3 is multiplexed and on the same feedback resource for transmission, for example, on the same resource associated with PUCCH 3; and when feedback information of the downlink transmission, such as PDSCH 2, PDSCH 1 and PDSCH 3, is not on the same feedback resource, the feedback information corresponding to the PDSCH is transmitted separately on PUCCH 2.

The feedback information of the at least two downlink transmissions corresponding to a same multiplexing window includes: start points or end points of time domain resources of the feedback information of the at least two downlink transmissions being located in the same multiplexing window for multiplexing the feedback information.

That is to say, the start points of the time domain resources of the feedback information of the at least two downlink transmissions are located in the same multiplexing window for multiplexing the feedback information, for example, the start points of the time domain resources of the feedback information of the at least two downlink transmissions are located in the same multiplexing window, and the end points of the time domain resources may or may not be the same, and just are not used as reference.

Figure 4:
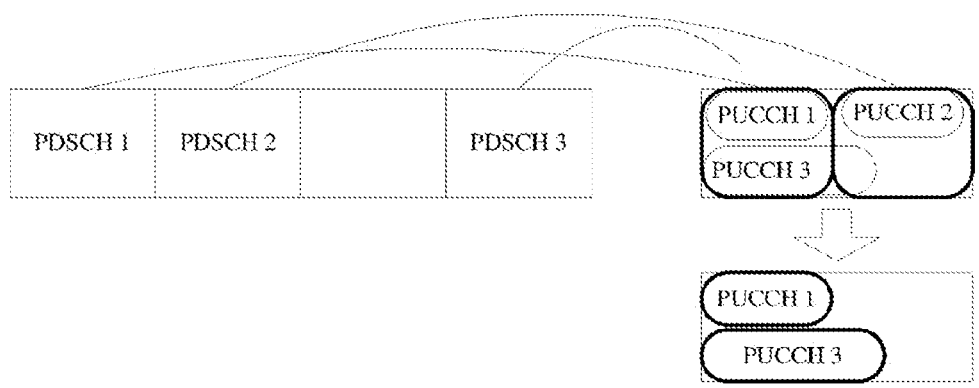
FIG. 4 is a second schematic diagram of a feedback resource multiplexing scenario according to an implementation of the present application.

For example, as shown in FIG. 4, if the granularity of the feedback timing (HARQ timing granularity) is half slot, the multiplexing window of the granularity for multiplexing the feedback information (HARQ-ACK) is also half slot.

For example, in the downlink transmissions PDSCH 1, PDSCH 2, and PDSCH 3, since the start points of the feedback resources, HARQ-ACK resources, of PDSCH 1 and PDSCH 3 fall on the same half slot, the feedback resources PUCCH 1 and PUCCH 3 of PDSCH 1 and PDSCH 3 are multiplexed on a resource associated with PUCCH 3; HARQ-ACK of PDSCH 2 is still to be sent on PUCCH 2. During multiplexing, other feedback information except the last scheduled feedback information among the at least two pieces of feedback information may be multiplexed on the feedback resource of the last scheduled feedback information to be transmitted.

Further, if PUCCH 2 overlaps with PUCCH 3, PUCCH 2 and PUCCH 3 may be further multiplexed, or may be transmitted independently, or it is directly agreed that resources for multiplexing HARQ-ACK cannot cross between half slots to avoid occurrence of a phenomenon of overlap between PUCCH 2 and PUCCH 3.

Or, when resources of the feedback information of the at least two downlink transmissions located in different multiplexing windows overlap partially, the feedback information of the at least two downlink transmissions located in different multiplexing windows is multiplexed on the same feedback resource. As long as the end points of the time domain resources of the feedback information of the at least two downlink transmissions are the same, all the start points of the time domain resources may or may not fall within the same multiplexing window.

Figure 5:
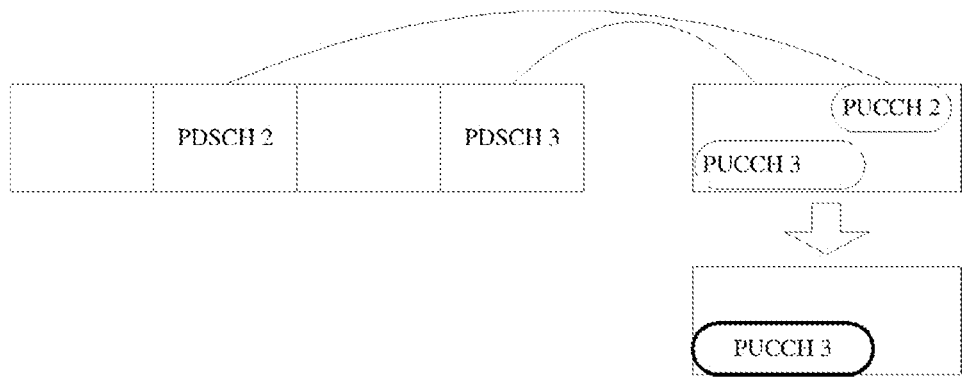
FIG. 5 is a third schematic diagram of a feedback resource multiplexing scenario according to an implementation of the present application.

For example, as shown in FIG. 5, if the granularity of the feedback timing is half slot, the multiplexing window of the granularity for multiplexing feedback information is also half slot. If the end points of the feedback resources of the feedback information PUCCH 2 and PUCCH 3 of PDSCH 2 and PDSCH 3 fall on the same half slot, then the feedback information of PDSCH 2 and PDSCH 3 is multiplexed on a resource associated with PUCCH 3. There are no feedback resources with the same end point for the feedback PUCCH corresponding to PDSCH 1, so the feedback information of the PDSCH is still to be sent on PUCCH 1. Further, if PUCCH 1 overlaps with PUCCH 3, they may be further multiplexed, or transmitted independently, or it is directly agreed that resources for multiplexing HARQ-ACK cannot cross between half slots to avoid occurrence of a phenomenon of overlap between PUCCH 1 and PUCCH 3.

Scenario Three

The granularity for multiplexing the feedback information is determined. Accordingly, multiplexing the feedback information of the at least two downlink transmissions on the same feedback resource in the multiplexing window includes multiplexing the feedback information of the at least two downlink transmissions on the same feedback resource when the resources of the feedback information of the at least two downlink transmissions overlap partially.

In this scenario, multiplexing rules may be agreed, for example, when the resources overlap partially in the time domain, multiplexing is performed, otherwise, the multiplexing is not performed.

In the above, the resources overlapping partially may mean that two pieces of downlink feedback information may be multiplexed on the same feedback resource when two resources overlap partially in the time domain. For example, referring to FIG. 6, where if feedback resources PUCCH 2 and PUCCH 3 corresponding to PDSCH 2 and PDSCH 3 overlap to some extent, PUCCH 2 and PUCCH 3 may be multiplexed on the same feedback resource PUCCH 3 to transmit feedback information corresponding to PDSCH 2 and PDSCH 3.

Scenario Four

The granularity for multiplexing the feedback information is determined. Accordingly, the method further includes: acquiring a multiplexing threshold value of a transmission resource of the feedback information.

In this scenario, multiplexing rules may also be agreed, for example, an upper limit of HARQ-ACK multiplexing is configured, and dividing of the granularity for multiplexing the HARQ-ACK multiplexing granularity and the multiplexing are performed according to actual scheduling situations.

In the above, the multiplexing threshold value may be set according to actual situations, for example, the value may be set to 2 or greater, which is not exhaustive in the implementation.

After acquiring the multiplexing threshold value of the transmission resource of the feedback information, the method further includes:

when M pieces of feedback information of M downlink transmissions are located in the same transmission resource, with M being an integer greater than or equal to 1, transmitting the feedback information respectively if the number M of pieces of corresponding feedback information in the same transmission resource is not greater than the multiplexing threshold value.

For example, when the multiplexing threshold value is 2, there may be two pieces of feedback information in one transmission resource, which may be one slot or half slot; and if 2 is not greater than the multiplexing threshold value, the feedback information is transmitted on the corresponding feedback resources respectively.

Or, when M pieces of feedback information of M downlink transmissions are located in the same transmission resource, with M being an integer greater than or equal to 1; and if the number M of pieces of corresponding feedback information in the same transmission resource is greater than the multiplexing threshold value, the time domain resources of the feedback information are divided based on the multiplexing threshold value to obtain at least two multiplexing windows; in the at least two multiplexing windows, some of the M pieces of feedback information are multiplexed on the same one feedback resource respectively.

In this way, the granularity for multiplexing the feedback information can be acquired in advance, which may be half slot for example. Then, assuming that the multiplexing threshold value is 2, when there are three pieces of feedback information in one slot, referring to FIG. 7, when there are feedback resources PUCCH 1, PUCCH 2 and PUCCH 3 corresponding to PDSCH 1, PDSCH 2 and PDSCH 3 in the slot, the transmission resources may be divided based on the granularity for multiplexing the feedback information, i.e., half slot, to obtain two half slots, and then PUCCH 1 and PUCCH 3 are multiplexed on PUCCH 3, and PUCCH 2 may be transmitted separately.

Or, when M pieces of feedback information of M downlink transmissions are located in the same transmission resource, with M being an integer greater than or equal to 1; and if the number M of pieces of corresponding feedback information in the same transmission resource is greater than the multiplexing threshold value, the time domain resources where the M pieces of feedback information are located are divided to obtain the granularity for multiplexing the feedback information.

Further, the time domain resources of the feedback information may be divided based on the multiplexing threshold value to obtain at least two multiplexing windows, wherein in the at least two multiplexing windows, some of the M pieces of feedback information are multiplexed on the same feedback resource respectively.

For example, referring to FIG. 8, assuming that the feedback resources PUCCH 1, PUCCH 2, and PUCCH 3 of PDSCH 1, PDSCH 2, and PDSCH 3 are all located in the same half slot resource, the half slot may be split to obtain two ¼ slots, and then PUCCH 1 and PUCCH 3 may be multiplexed on PUCCH 3, and PUCCH 2 may be sent separately.

Based on the above solution, the implementation can transmit the feedback information of downlink transmissions to the network side on the transmission resources of the determined feedback information.

Scenario Five

The granularity for multiplexing is indicated by at least one of: service type, high-level configuration and physical layer indication.

Specifically, the granularity for multiplexing is determined according to the service type, and/or the granularity for multiplexing is determined according to the high-level configuration; which granularity for multiplexing is used may be determined by the terminal device itself according to the service type; or, the granularity for multiplexing may be determined by configuring the granularity for multiplexing of the high-level configuration using the service type. For example, there may be a corresponding relation between the service type and the granularity for multiplexing of the high-level configuration. For example, for URLLC services, a granularity for multiplexing (2symbol) of the high-level configuration is used, and for eMBB services, a granularity for multiplexing Oslo® of the high-level configuration is used.

The granularity for multiplexing may be determined according to the physical layer indication (explicit or implicit) and the size of the granularity for multiplexing of the high-level configuration. For example, for MCS-C-RNTI (Modulation Coding Scheme-Cell-Radio Network Temporary Identifier) scrambled URLLC services, a granularity for multiplexing (2symbol) of the high-level configuration is used, and for C-RNTI scrambled PDCCHeMBB services, a granularity for multiplexing Oslo® of the high-level configuration is used.

In addition, the physical layer indication also includes: service indication information, PDCCH configuration, etc., e.g., at least one of aggregation level, CORESET and Format, but the implementations are not limit thereto.

The solution provided in the implementation may be applied to low-latency services such as URLLC services. Of course, the low-latency services are not limited to the URLLC services, and may be other low-latency services, which are not exhaustive in the implementation.

It can be seen that by adopting the above solution, the granularity for multiplexing the feedback information can be set such that the multiplexing window for multiplexing the feedback information can be partial of a slot. In this way, latency of the feedback information can be reduced, such that latency requirements can be met, which is more suitable for services sensitive to transmission latency.

Implementation Two

Figure 9:
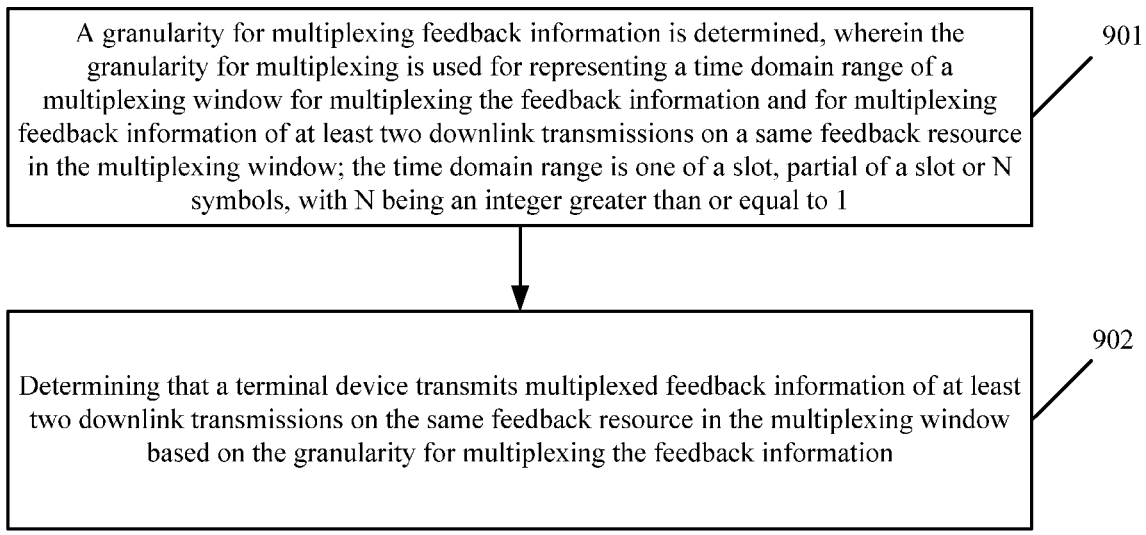
FIG. 9 is a second schematic flowchart of a method for multiplexing on a feedback resource according to an implementation of the present application.

An implementation of the present disclosure provides a method for multiplexing on a feedback resource, which is applied to a network device, and, as shown in FIG. 9, the method includes the following acts 901 and 902.

In act 901, granularity for multiplexing feedback information is determined, wherein the granularity for multiplexing is used for representing a time domain range of a multiplexing window for multiplexing the feedback information and for multiplexing feedback information of at least two downlink transmissions on a same feedback resource in the multiplexing window; the time domain range is one of a slot, partial of a slot or N symbols, with N being an integer greater than or equal to 1.

In act 902, it is determined that a terminal device transmits multiplexed feedback information of at least two downlink transmissions on the same feedback resource in the multiplexing window based on the granularity for multiplexing the feedback information.

The implementation corresponds to the following several processing scenarios:

Scenario One

That is, the granularity for multiplexing the feedback information is semi-statically configured. It may be configured by a high-level signaling or preconfigured by the terminal device itself.

In the above, the high-level signaling may be a RRC signaling. Of course, the granularity for multiplexing the feedback information may also be configured through DCI. It should be indicated that if the granularity for multiplexing the feedback information is configured through DCI, the granularity for multiplexing the feedback information may not need to be contained every time the DCI is sent, and the DCI is sent only when the granularity for multiplexing the feedback information needs to be reconfigured.

The feedback information may be feedback information of downlink transmission, wherein the downlink transmission may be downlink control information (DCI) or a downlink transmission scheduled by the DCI. When the downlink transmission is the downlink transmission scheduled by the DCI, a physical downlink control channel (PDCCH) may refer to information transmitted by a physical downlink shared channel (PDSCH).

The feedback information of downlink transmission may be acknowledgement (ACK)/non-acknowledgement (NACK) information of hybrid automatic repeat request (HARQ). For example, the granularity for multiplexing the semi-statically configured HARQ-ACK is N symbols.

In this scenario, when feedback information of at least two downlink transmissions is processed, and when the feedback information of the at least two downlink transmissions correspond to a same multiplexing window, the feedback information of the at least two downlink transmissions is multiplexed on the same feedback resource; or, when feedback resources for the at least two downlink transmissions are not in the same multiplexing window, the feedback information is transmitted on the corresponding feedback resources respectively.

The feedback information may be multiplexed on the same feedback resource in the same multiplexing window.

In the above, a method for determining whether at least two pieces of feedback information fall in the same multiplexing window may be to determine whether start points and/or end points of the at least two feedback resources fall in the same multiplexing window. For example, when all the start points and end points of the at least two feedback resources fall in the same multiplexing window, or all the start points of the at least two feedback resources fall in the same multiplexing window, or all the end points of the at least two feedback resources fall in the same multiplexing window.

Further, during multiplexing, other feedback information except the last scheduled feedback information among the at least two pieces of feedback information may be multiplexed on the feedback resource of the last scheduled feedback information to be transmitted.

Scenario Two

Determining the granularity for multiplexing the feedback information further includes determining the granularity for multiplexing the feedback information based on a granularity of a feedback timing, wherein the granularity of the feedback timing is one of a slot, partial of a slot or N symbols, with N being an integer greater than or equal to 1.

In the above, the granularity of the feedback timing may be configured by a high-level signaling or preconfigured by the terminal device itself.

The high-level signaling may be a RRC signaling. Of course, the granularity for multiplexing the feedback information may be configured through DCI. It should be indicated that if the granularity for multiplexing the feedback information is configured through the DCI, the granularity for multiplexing the feedback information may not need to be contained every time the DCI is sent, and the DCI is sent only when the granularity for multiplexing the feedback information needs to be reconfigured.

The feedback information may be feedback information of downlink transmission, wherein the feedback information may be downlink control information (DCI) or downlink transmission scheduled by the DCI. When the downlink transmission is the downlink transmission scheduled by the DCI, a physical downlink control channel (PDCCH) may refer to information transmitted by a physical downlink shared channel (PDSCH).

The feedback information of downlink transmission may be acknowledgement (ACK)/non-acknowledgement (NACK) information of hybrid automatic repeat request (HARQ). That is, the granularity for multiplexing HARQ-ACK is determined based on HARQ-ACK timing granularity, which is the same as the granularity for multiplexing HARQ-ACK. For a case in which HARQ-ACK multiplexing windows pointed by HARQ-ACK timing are the same, HARQ-ACK is multiplexed.

Determining the granularity for multiplexing the feedback information includes determining the granularity for multiplexing the feedback information to be the same as the granularity of the feedback timing. That is, the granularity for multiplexing the feedback information is set to be the same as the granularity of the feedback timing.

Specifically, in this method, multiplexing the feedback information of the at least two downlink transmissions on the same feedback resource in the multiplexing windows further includes:

multiplexing the feedback information of the at least two downlink transmissions on the same feedback resource when the feedback information of the at least two downlink transmissions correspond to a same multiplexing window.

For example, as shown in FIG. 3, if the granularity of the feedback timing, such as a granularity of HARQ timing, is half slot, then the granularity for multiplexing the feedback information, such as a HARQ-ACK multiplexing window, is also half slot. When the downlink transmission is a PDSCH, it is assumed that HARQ-ACK multiplexing for which the downlink transmission is PDSCH 1 and PDSCH 3 is transmitted on the same feedback resource, for example, on a same resource associated with PUCCH 3; and when feedback information of downlink transmissions, such as PDSCH 2, PDSCH 1 and PDSCH 3, is not on the same feedback resource, the feedback information corresponding to the PDSCH is transmitted separately on PUCCH 2.

The feedback information of the at least two downlink transmissions corresponding to a same multiplexing window includes: start points or end points of time domain resources of the feedback information of the at least two downlink transmissions being located in the same multiplexing window for multiplexing the feedback information.

That is to say, the start points of the time domain resources of the feedback information of the at least two downlink transmissions are located in the same multiplexing window for multiplexing the feedback information, for example, the start points of the time domain resources of the feedback information of the at least two downlink transmissions are located in the same multiplexing window, and the end points of the time domain resources may or may not be the same, and just are not used as reference.

For example, as shown in FIG. 4, if the granularity of the feedback timing (the granularity of HARQ timing) is half slot, the multiplexing window of the granularity for multiplexing the feedback information (HARQ-ACK) is also half slot.

For example, in downlink transmissions PDSCH 1, PDSCH 2, and PDSCH 3, since the start points of the feedback resources, HARQ-ACK resources, of PDSCH 1 and PDSCH 3 fall on the same half slot, the feedback resources PUCCH 1 and PUCCH 3 of PDSCH 1 and PDSCH 3 are multiplexed on a resource associated with PUCCH 3; HARQ-ACK of PDSCH 2 is still sent on PUCCH 2. During the multiplexing, other feedback information except the last scheduled feedback information among the at least two pieces of feedback information may be multiplexed on the feedback resource of the last scheduled feedback information to be transmitted.

Further, if PUCCH 2 overlaps with PUCCH 3, PUCCH 2 and PUCCH 3 may be further multiplexed, or may be transmitted independently, or it is directly agreed that resources for multiplexing HARQ-ACK cannot cross between half slots to avoid occurrence of a phenomenon of overlap between PUCCH 2 and PUCCH 3.

Or, when resources for feedback information of at least two downlink transmissions located in different multiplexing windows overlap partially, it is determined that the terminal device multiplexes the feedback information of the at least two downlink transmissions located in different multiplexing windows on the same feedback resource. As long as the end points of the time domain resources of the feedback information of the at least two downlink transmissions are the same, all the start points of the time domain resources may or may not fall within the same multiplexing window.

For example, as shown in FIG. 5, if the granularity of the feedback timing is half slot, the multiplexing window of the granularity for multiplexing feedback information is also half slot. If the end points of the feedback resources of the feedback information PUCCH 2 and PUCCH 3 of PDSCH 2 and PDSCH 3 fall on the same half slot, then the feedback information of PDSCH 2 and PDSCH 3 is multiplexed on a resource associated with PUCCH 3. There are no feedback resources with the same end point in the feedback PUCCH corresponding to PDSCH 1, so the feedback information of the PDSCH is still sent on PUCCH 1. Further, if PUCCH 1 overlaps with PUCCH 3, they may be further multiplexed, or transmitted independently, or it is directly agreed that resources for multiplexing HARQ-ACK cannot cross between half slots to avoid occurrence of a phenomenon of overlap between PUCCH 1 and PUCCH 3.

Scenario Three

The granularity for multiplexing the feedback information is determined. Accordingly, multiplexing the feedback information of the at least two downlink transmissions on the same feedback resource in the multiplexing windows includes determining that the terminal device multiplexes the feedback information of the at least two downlink transmissions on the same feedback resource when the resources for the feedback information of the at least two downlink transmissions overlap partially.

In this scenario, multiplexing rules may be agreed, for example, when the resources overlap partially in the time domain, multiplexing is performed, otherwise the multiplexing is not performed.

In the above, the resources overlapping partially may mean that two pieces of downlink feedback information may be multiplexed on the same feedback resource when two resources overlap partially in the time domain. For example, referring to FIG. 6, where if feedback resources PUCCH 2 and PUCCH 3 corresponding to PDSCH 2 and PDSCH 3 overlap to some extent, PUCCH 2 and PUCCH 3 may be multiplexed on the same feedback resource PUCCH 3 to transmit feedback information corresponding to PDSCH 2 and PDSCH 3.

Scenario Four

The granularity for multiplexing the feedback information is determined. Accordingly, the method further includes: acquiring a multiplexing threshold value of a transmission resource of the feedback information.

In this scenario, multiplexing rules may also be agreed, for example, an upper limit of HARQ-ACK multiplexing is configured, and dividing and multiplexing of the granularity for multiplexing HARQ-ACK is performed according to actual scheduling situations.

In the above, the multiplexing threshold value may be set according to actual situations, for example, it may be set to 2 or greater, which is not exhaustive in the implementation.

After acquiring the multiplexing threshold value of the transmission resource of the feedback information, the method further includes:

when M pieces of feedback information of M downlink transmissions are located in the same transmission resource, with M being an integer greater than or equal to 1, determining that the terminal device transmits the feedback information respectively if the number M of pieces of corresponding feedback information in the same transmission resource is not greater than the multiplexing threshold value.

For example, when the multiplexing threshold value is 2, there may be two pieces of feedback information in one transmission resource in one slot or half slot; and if 2 is not greater than the multiplexing threshold value, the feedback information is transmitted on the corresponding feedback resources respectively.

Or, when M pieces of feedback information of M downlink transmissions are located in the same transmission resource, with M being an integer greater than or equal to 1; and if the number M of pieces of corresponding feedback information in the same transmission resource is greater than the multiplexing threshold value, the time domain resources of the feedback information are divided based on the multiplexing threshold value to obtain at least two multiplexing windows; in the at least two multiplexing windows, some of the M pieces of feedback information are multiplexed on the same feedback resource respectively.

In this way, the granularity for multiplexing the feedback information can be acquired in advance, which may be half slot for example. Then, assuming that the multiplexing threshold value is 2, when there are three pieces of feedback information in one slot, referring to FIG. 7, when there are feedback resources PUCCH 1, PUCCH 2 and PUCCH 3 corresponding to PDSCH 1, PDSCH 2 and PDSCH 3 in the slot, the transmission resources may be divided based on the granularity for multiplexing the feedback information, i.e., half slot, to obtain two half slots, and then PUCCH 1 and PUCCH 3 are multiplexed on PUCCH 3, and PUCCH 2 may be transmitted separately.

Or, when M pieces of feedback information of M downlink transmissions are located in the same transmission resource, with M being an integer greater than or equal to 1; and if the number M of pieces of corresponding feedback information in the same transmission resource is greater than the multiplexing threshold value, it is determined that the terminal device divides the time domain resources where the M pieces of feedback information are located to obtain the granularity for multiplexing the feedback information.

Further, the time domain resources of the feedback information may be divided based on the multiplexing threshold value to obtain at least two multiplexing windows; in the at least two multiplexing windows, some of the M pieces of feedback information are multiplexed on the same feedback resource respectively.

For example, referring to FIG. 8, assuming that the feedback resources PUCCH 1, PUCCH 2, and PUCCH 3 of PDSCH 1, PDSCH 2, and PDSCH 3 are all in the same half slot resource, the half slot may be split to obtain two ¼ slots, and then PUCCH 1 and PUCCH 3 may be multiplexed on PUCCH 3, and PUCCH 2 may be sent separately.

Scenario Five

The granularity for multiplexing of the terminal device is determined by at least one of: service type, high-level configuration and physical layer indication.

Specifically, the granularity for multiplexing is determined according to the service type, and/or the granularity for multiplexing is determined according to the high-level configuration; which granularity for multiplexing is used may be determined by the terminal device itself according to the service type; or the granularity for multiplexing may be determined by configuring the granularity for multiplexing of the high-level configuration using the service type. For example, there may be a corresponding relation between the service type and the granularity for multiplexing of the high-level configuration. For example, for URLLC services, a granularity for multiplexing (2symbol) of the high-level configuration is used, and for eMBB services, a granularity for multiplexing Oslo® of the high-level configuration is used.

The granularity for multiplexing may be determined according to the physical layer indication (explicit or implicit) and the size of the granularity for multiplexing of the high-level configuration. For example, for MCS-C-RNTI scrambled URLLC services, a granularity for multiplexing (2symbol) of the high-level configuration is used, and for C-RNTI scrambled PDCCHeMBB services, a granularity for multiplexing (1 slot) of the high-level configuration is used.

In addition, the physical layer indication also includes: service indication information, PDCCH configuration, etc., e.g., at least one of aggregation level, CORESET and Format, but the implementations are not limit thereto.

The solution provided in the implementation may be applied to low-latency services such as URLLC services. Of course, the low-latency services are not limited to the URLLC services, and may be other low-latency services, which are not exhaustive in the implementation.

It can be seen that by adopting the above solution, the granularity for multiplexing the feedback information can be set such that the multiplexing window for multiplexing the feedback information can be partial of a slot. In this way, latency of the feedback information can be reduced, such that latency requirements can be met, which is more suitable for services sensitive to transmission latency.

Implementation Three

An implementation of the present disclosure provides a terminal device including:

a first processing unit configured to determine a granularity for multiplexing feedback information, wherein the granularity for multiplexing is used for representing a time domain range of a multiplexing window for multiplexing the feedback information and for multiplexing feedback information of at least two downlink transmissions on the same feedback resource in the multiplexing window; the time domain range is one of a slot, partial of a slot or N symbols, with N being an integer greater than or equal to 1.

The implementation corresponds to the following several processing scenarios:

Scenario One

That is, the granularity for multiplexing the feedback information is semi-statically configured. It may be configured by a high-level signaling or preconfigured by the terminal device itself.

In the above, the high-level signaling may be a RRC signaling. Of course, the granularity for multiplexing the feedback information may be configured through DCI. It should be indicated that if the granularity for multiplexing the feedback information is configured through the DCI, the granularity for multiplexing the feedback information may not need to be contained every time the DCI is sent, and the DCI is sent only when the granularity for multiplexing the feedback information needs to be reconfigured.

The feedback information may be feedback information of a downlink transmission, wherein the downlink transmission may be downlink control information (DCI) or a downlink transmission scheduled by the DCI. When the downlink transmission is the downlink transmission scheduled by the DCI, a physical downlink control channel (PDCCH) may refer to information transmitted by a physical downlink shared channel (PDSCH).

The feedback information of downlink transmission may be acknowledgement (ACK)/non-acknowledgement (NACK) information of hybrid automatic repeat request (HARQ). For example, the granularity for multiplexing the semi-statically configured HARQ-ACK is N symbols.

In this scenario, when feedback information of at least two downlink transmissions is processed, and when the feedback information of the at least two downlink transmissions correspond to a same multiplexing window, the feedback information of the at least two downlink transmissions are multiplexed on the same feedback resource; or, when feedback resources for at least two downlink transmissions are not in the same multiplexing window, the feedback information is transmitted on the corresponding feedback resources respectively.

The feedback information may be multiplexed on the same feedback resource in the same multiplexing window.

In the above, a method for determining whether at least two pieces of feedback information fall in the same multiplexing window may be to determine whether start points and/or end points of the at least two feedback resources fall in the same multiplexing window. For example, when all the start points and/or end points of the at least two feedback resources fall in the same multiplexing window, or all the start points of the at least two feedback resources fall in the same multiplexing window, or all the end points of the at least two feedback resources fall in the same multiplexing window.

Further, during multiplexing, other feedback information except the last scheduled feedback information among the at least two pieces of feedback information may be multiplexed on the feedback resource of the last scheduled feedback information to be transmitted.

Scenario Two

Determining the granularity for multiplexing the feedback information further includes the first processing unit determining the granularity for multiplexing the feedback information based on a granularity of a feedback timing, wherein the granularity of the feedback timing is one of a slot, partial of a slot or N symbols, with N being an integer greater than or equal to 1.

In the above, the granularity of the feedback timing may be configured by a high-level signaling or preconfigured by the terminal device itself.

The high-level signaling may be a RRC signaling. Of course, the granularity for multiplexing the feedback information may be configured through DCI. It should be indicated that if the granularity for multiplexing the feedback information is configured through the DCI, the granularity for multiplexing the feedback information may not need to be contained every time the DCI is sent, and the DCI is sent only when the granularity for multiplexing the feedback information needs to be reconfigured.

The feedback information may be feedback information of a downlink transmission, wherein the downlink transmission may be downlink control information (DCI) or a downlink transmission scheduled by the DCI. When the downlink transmission is the downlink transmission scheduled by the DCI, a physical downlink control channel (PDCCH) may refer to information transmitted by a physical downlink shared channel (PDSCH).

The feedback information of downlink transmission may be acknowledgement (ACK)/non-acknowledgement (NACK) information of hybrid automatic repeat request (HARQ). That is, the granularity for multiplexing HARQ-ACK is determined based on HARQ-ACK timing granularity, which is the same as the granularity for multiplexing HARQ-ACK. For a case where HARQ-ACK multiplexing windows pointed by HARQ-ACK timing are the same, HARQ-ACK is multiplexed.

The first processing unit determines the granularity for multiplexing the feedback information to be the same as the granularity of the feedback timing. That is, the granularity for multiplexing the feedback information is set to be the same as the granularity of the feedback timing.

Specifically, the feedback information of the at least two downlink transmissions are multiplexed on the same feedback resource in the multiplexing windows, and the first processing unit is further configured to:

multiplex the feedback information of the at least two downlink transmissions on the same feedback resource when the feedback information of the at least two downlink transmissions correspond to a same multiplexing window.

For example, as shown in FIG. 3, if the granularity of the feedback timing, such as HARQ timing granularity, is half slot, then the granularity for multiplexing the feedback information, such as a HARQ-ACK multiplexing window, is also half slot. When the downlink transmission is a PDSCH, it is assumed that HARQ-ACK multiplexing for which the downlink transmission is PDSCH 1 and PDSCH 3 is transmitted on the same feedback resource, for example, on the same resource associated with PUCCH 3; and when feedback information of downlink transmissions, such as PDSCH 2, PDSCH 1 and PDSCH 3, is not on the same feedback resource, the feedback information corresponding to the PDSCH is transmitted separately on PUCCH 2.

In the first processing unit, start points or end points of time domain resources of the feedback information of the at least two downlink transmissions are located in the same multiplexing window for multiplexing the feedback information.

That is to say, the start points of the time domain resources of the feedback information of the at least two downlink transmissions are located in the same multiplexing window for multiplexing the feedback information, for example, the start points of the time domain resources of the feedback information of the at least two downlink transmissions are located in the same multiplexing window, and the end points of the time domain resources may or may not be the same, and just are not used as reference.

For example, as shown in FIG. 4, if the granularity of the feedback timing (HARQ timing granularity) is half slot, the multiplexing window of the granularity for multiplexing the feedback information (HARQ-ACK) is also half slot.

For example, in downlink transmissions PDSCH 1, PDSCH 2, and PDSCH 3, since the start points of the feedback resources, HARQ-ACK resources, of PDSCH 1 and PDSCH 3 fall on the same half slot, the feedback resources PUCCH 1 and PUCCH 3 of PDSCH 1 and PDSCH 3 are multiplexed on a resource associated with PUCCH 3; HARQ-ACK of PDSCH 2 is still sent on PUCCH 2. During multiplexing, other feedback information except the last scheduled feedback information among the at least two pieces of feedback information may be multiplexed on the feedback resource of the last scheduled feedback information to be transmitted.

Further, if PUCCH 2 overlaps with PUCCH 3, PUCCH 2 and 3 may be further multiplexed, or may be transmitted independently, or it is directly agreed that resources for multiplexing HARQ-ACK cannot cross between half slots to avoid occurrence of phenomenon of overlap between PUCCH 2 and PUCCH 3.

Or, when resources for the feedback information of the at least two downlink transmissions located in different multiplexing windows overlap partially, the feedback information of the at least two downlink transmissions located in different multiplexing windows are multiplexed on the same feedback resource. As long as the end points of the time domain resources of the feedback information of at least two downlink transmissions are the same, all the start points of the time domain resources may or may not fall within the same multiplexing window.

For example, as shown in FIG. 5, if the granularity of the feedback timing is half slot, the multiplexing window of the granularity for multiplexing feedback information is also half slot. If end points of the feedback resources of the feedback information PUCCH 2 and PUCCH 3 of PDSCH 2 and PDSCH 3 fall on the same half slot, then the feedback information of PDSCH 2 and PDSCH 3 is multiplexed on a resource associated with PUCCH 3. There are no feedback resources with the same end point in the feedback PUCCH corresponding to PDSCH 1, so the feedback information of the PDSCH is still sent on PUCCH 1. Further, if PUCCH 1 overlaps with PUCCH 3, they may be further multiplexed, or transmitted independently, or it is directly agreed that resources for multiplexing HARQ-ACK cannot cross between half slots to avoid occurrence of a phenomenon of overlap between PUCCH 1 and PUCCH 3.

Scenario Three

The granularity for multiplexing the feedback information is determined. Accordingly, multiplexing the feedback information of the at least two downlink transmissions on the same feedback resource in the multiplexing windows includes multiplexing the feedback information of the at least two downlink transmissions on the same feedback resource when the resources for the feedback information of the at least two downlink transmissions overlap partially.

In this scenario, multiplexing rules may be agreed, for example, when the resources overlap partially in the time domain, multiplexing is performed, otherwise the multiplexing is not performed.

In the above, the resources overlapping partially may mean that two pieces of downlink feedback information may be multiplexed on the same feedback resource when two resources overlap partially in the time domain. For example, referring to FIG. 6, where if feedback resources PUCCH 2 and PUCCH 3 corresponding to PDSCH 2 and PDSCH 3 overlap to some extent, PUCCH 2 and PUCCH 3 may be multiplexed on the same feedback resource PUCCH 3 to transmit feedback information corresponding to PDSCH 2 and PDSCH 3.

Scenario Four

The granularity for multiplexing the feedback information is determined. Accordingly, the first processing unit is further configured to: acquire a multiplexing threshold value of a transmission resource of the feedback information.

In this scenario, multiplexing rules may also be agreed, for example, an upper limit of HARQ-ACK multiplexing is configured, and dividing of the granularity for multiplexing HARQ-ACK and multiplexing are performed according to actual scheduling situations.

In the above, the multiplexing threshold value may be set according to actual situations, for example, it may be set to 2 or greater, which is not exhaustive in the implementation.

After acquiring the multiplexing threshold value of the transmission resource of the feedback information, when M pieces of feedback information of M downlink transmissions are located in the same transmission resource, with M being an integer greater than or equal to 1; the first processing unit transmits the feedback information respectively if the number M of pieces of corresponding feedback information in the same transmission resource is not greater than the multiplexing threshold value.

For example, when the multiplexing threshold value is 2, there may be two pieces of feedback information in one transmission resource, which may be one slot or half slot; and if 2 is not greater than the multiplexing threshold value, the feedback information is transmitted on the corresponding feedback resources respectively.

Or, when M pieces of feedback information of M downlink transmissions are located in the same transmission resource, with M being an integer greater than or equal to 1; and if the number M of pieces of corresponding feedback information in the same transmission resource is greater than the multiplexing threshold value, the time domain resources of the feedback information are divided based on the multiplexing threshold value to obtain at least two multiplexing windows; in the at least two multiplexing windows, some of the M pieces of feedback information are multiplexed on the same feedback resource respectively.

In this way, the granularity for multiplexing the feedback information can be acquired in advance, which may be half slot for example. Then, assuming that the multiplexing threshold value is 2, when there are three pieces of feedback information in one slot, referring to FIG. 7, when there are feedback resources PUCCH 1, PUCCH 2 and PUCCH 3 corresponding to PDSCH 1, PDSCH 2 and PDSCH 3 in the slot, the transmission resources may be divided based on the granularity for multiplexing the feedback information, i.e., half slot, to obtain two half slots, and then PUCCH 1 and PUCCH 3 are multiplexed on PUCCH 3, and PUCCH 2 may be transmitted separately.

Or, when M pieces of feedback information of M downlink transmissions are located in the same transmission resource, with M being an integer greater than or equal to 1; and if the number M of pieces of corresponding feedback information in the same transmission resource is greater than the multiplexing threshold value, the time domain resources where the M pieces of feedback information are located are divided to obtain the granularity for multiplexing the feedback information.

Further, the time domain resources of the feedback information may be divided based on the multiplexing threshold value to obtain at least two multiplexing windows; in the at least two multiplexing windows, some of the M pieces of feedback information are multiplexed on the same feedback resource respectively.

For example, referring to FIG. 8, assuming that the feedback resources PUCCH 1, PUCCH 2, and PUCCH 3 of PDSCH 1, PDSCH 2, and PDSCH 3 are all in the same half slot resource, the half slot may be split to obtain two ¼ slots, and then PUCCH 1 and 3 may be multiplexed on PUCCH 3, and PUCCH 2 may be sent separately.

Scenario Five

The first processing unit determines the granularity for multiplexing by at least one of: service type, high-level configuration and physical layer indication.

Specifically, the granularity for multiplexing is determined according to the service type, and/or the granularity for multiplexing is determined according to the high-level configuration; which granularity for multiplexing is used may be determined by the terminal device itself according to the service type; or the granularity for multiplexing may be determined by configuring the granularity for multiplexing of the high-level configuration using the service type. For example, there may be a corresponding relation between the service type and the granularity for multiplexing of the high-level configuration. For example, for URLLC services, a granularity for multiplexing (2symbol) of the high-level configuration is used, and for eMBB services, a granularity for multiplexing Oslo® of the high-level configuration is used.

The granularity for multiplexing may be determined according to the physical layer indication (explicit or implicit) and the size of the granularity for multiplexing of the high-level configuration. For example, for MCS-C-RNTI scrambled URLLC services, the granularity for multiplexing (2symbol) of the high-level configuration is used, and for C-RNTI scrambled PDCCHeMBB services, the granularity for multiplexing (1 slot) of the high-level configuration is used.

In addition, the physical layer indication also includes: service indication information, PDCCH configuration, etc., e.g., at least one of aggregation level, CORESET and Format, but the implementations are not limit thereto.

Based on the above solution, the implementation can transmit to the network side the feedback information of downlink transmissions on the transmission resources of the determined feedback information.

The solution provided in the implementation may be applied to low-latency services such as URLLC services. Of course, the low-latency services are not limited to the URLLC services, and may be other low-latency services, which are not exhaustive in the implementation.

It can be seen that by adopting the above solution, the granularity for multiplexing the feedback information can be set such that the multiplexing window for multiplexing the feedback information can be partial of a slot. In this way, latency of the feedback information can be reduced, such that latency requirements can be met, which is more suitable for services sensitive to transmission latency.

Implementation Four

An implementation of the present disclosure provides a network device including:

a second processing unit configured to determine a granularity for multiplexing feedback information, wherein the granularity for multiplexing is used for representing a time domain range of a multiplexing window for multiplexing the feedback information and for multiplexing feedback information of at least two downlink transmissions on the same feedback resource in the multiplexing window; the time domain range is one of a slot, partial of a slot or N symbols, with N being an integer greater than or equal to 1; and to determine that a terminal device transmits multiplexed feedback information of the at least two downlink transmissions on the same feedback resource in the multiplexing window based on the granularity for multiplexing the feedback information.

The implementation corresponds to the following several processing scenarios:

Scenario One

That is, the granularity for multiplexing the feedback information is semi-statically configured. It may be configured by a high-level signaling or preconfigured by the terminal device itself.

In the above, the high-level signaling may be a RRC signaling. Of course, the granularity for multiplexing the feedback information may be configured through DCI. It should be indicated that if the granularity for multiplexing the feedback information is configured through the DCI, the granularity for multiplexing the feedback information may not need to be contained every time the DCI is sent, and the DCI is sent only when the granularity for multiplexing the feedback information needs to be reconfigured.

The feedback information may be feedback information of a downlink transmission, wherein the downlink transmission may be downlink control information (DCI) or a downlink transmission scheduled by the DCI. When the downlink transmission is the downlink transmission scheduled by the DCI, a physical downlink control channel (PDCCH) may refer to information transmitted by a physical downlink shared channel (PDSCH).

The feedback information of downlink transmission may be acknowledgement (ACK)/non-acknowledgement (NACK) information of hybrid automatic repeat request (HARQ). For example, the granularity for multiplexing the semi-statically configured HARQ-ACK is N symbols.

In this scenario, when feedback information of at least two downlink transmissions is processed, and when the feedback information of the at least two downlink transmissions correspond to a same multiplexing window, the feedback information of the at least two downlink transmissions are multiplexed on the same feedback resource; or, when at least two feedback resources for downlink transmission are not in the same multiplexing window, the feedback information is transmitted on the corresponding feedback resources respectively.

The feedback information may be multiplexed on the same feedback resource in the same multiplexing window.

In the above, a method for determining whether at least two pieces of feedback information fall in the same multiplexing window may be to determine whether start points and/or end points of the at least two feedback resources fall in the same multiplexing window. For example, when all the start points and/or end points of the at least two feedback resources fall in the same multiplexing window, or all the start points of the at least two feedback resources fall in the same multiplexing window, or all the end points of the at least two feedback resources fall in the same multiplexing window.

Further, during multiplexing, other feedback information except the last scheduled feedback information among the at least two pieces of feedback information may be multiplexed on the feedback resource of the last scheduled feedback information to be transmitted.

Scenario Two

Determining the granularity for multiplexing the feedback information further includes the second processing unit determining the granularity for multiplexing the feedback information based on a granularity of a feedback timing, wherein the granularity of the feedback timing is one of a slot, partial of a slot or N symbols, with N being an integer greater than or equal to 1.

In the above, the granularity of the feedback timing may be configured by a high-level signaling or preconfigured by the terminal device itself.

The high-level signaling may be a RRC signaling. Of course, the granularity for multiplexing the feedback information may be configured through DCI. It should be indicated that if the granularity for multiplexing the feedback information is configured through the DCI, the granularity for multiplexing the feedback information may not need to be contained every time the DCI is sent, and the DCI is sent only when the granularity for multiplexing the feedback information needs to be reconfigured.

The feedback information may be feedback information of a downlink transmission, wherein the downlink transmission may be downlink control information (DCI) or a downlink transmission scheduled by the DCI. When the downlink transmission is the downlink transmission scheduled by the DCI, a physical downlink control channel (PDCCH) may refer to information transmitted by a physical downlink shared channel (PDSCH).

The feedback information of downlink transmission may be acknowledgement (ACK)/non-acknowledgement (NACK) information of hybrid automatic repeat request (HARQ). That is, the granularity for multiplexing HARQ-ACK is determined based on HARQ-ACK timing granularity, which is the same as the granularity for multiplexing HARQ-ACK. For a case in which HARQ-ACK multiplexing windows pointed by HARQ-ACK timing are the same, HARQ-ACK is multiplexed.

The second processing unit determines the granularity for multiplexing the feedback information to be the same as the granularity of the feedback timing. That is, the granularity for multiplexing the feedback information is set to be the same as the granularity of the feedback timing.

Specifically, it is determined that the terminal device multiplexes the feedback information of the at least two downlink transmissions on the same feedback resource when the feedback information of the at least two downlink transmissions correspond to a same multiplexing window.

For example, as shown in FIG. 3, if the granularity of the feedback timing, such as HARQ timing granularity, is half slot, then the granularity for multiplexing the feedback information, such as a HARQ-ACK multiplexing window, is also half slot. When the downlink transmission is a PDSCH, it is assumed that HARQ-ACK multiplexing for which the downlink transmission is PDSCH 1 and PDSCH 3 is transmitted on the same feedback resource, for example, on a same resource associated with PUCCH 3; and when feedback information of downlink transmissions, such as PDSCH 2, PDSCH 1 and PDSCH 3, is not on the same feedback resource, the feedback information corresponding to the PDSCH is transmitted separately on PUCCH 2.

The feedback information of the at least two downlink transmissions corresponding to a same multiplexing window includes: start points or end points of time domain resources of the feedback information of the at least two downlink transmissions being located in the same multiplexing window for multiplexing the feedback information.

That is to say, the start points of the time domain resources of the feedback information of the at least two downlink transmissions are located in the same multiplexing window for multiplexing the feedback information, for example, the start points of the time domain resources of the feedback information of at least two downlink transmissions are located in the same multiplexing window, and the end points of the time domain resources may or may not be the same, and just are not used as reference.

For example, as shown in FIG. 4, if the granularity of the feedback timing (HARQ timing granularity) is half slot, the multiplexing window of the granularity for multiplexing the feedback information (HARQ-ACK) is also half slot.

For example, in downlink transmissions PDSCH 1, PDSCH 2, and PDSCH 3, since the start points of the feedback resources, HARQ-ACK resources, of PDSCH 1 and PDSCH 3 fall on the same half slot, the feedback resources PUCCH 1 and PUCCH 3 of PDSCH 1 and PDSCH 3 are multiplexed on a resource associated with PUCCH 3; HARQ-ACK of PDSCH 2 is still sent on PUCCH 2. During multiplexing, other feedback information except the last scheduled feedback information among the at least two pieces of feedback information may be multiplexed on the feedback resource of the last scheduled feedback information for transmission.

Further, if PUCCH 2 overlaps with PUCCH 3, PUCCH 2 and PUCCH 3 may be further multiplexed, or may be transmitted independently, or it is directly agreed that resources for multiplexing HARQ-ACK cannot cross between half slots to avoid occurrence of a phenomenon of overlap between PUCCH 2 and PUCCH 3.

Or, when resources for feedback information of at least two downlink transmissions located in different multiplexing windows overlap partially, it is determined that the terminal device multiplexes the feedback information of the at least two downlink transmissions located in different multiplexing windows on the same feedback resource. As long as the end points of the time domain resources of the feedback information of at least two downlink transmissions are the same, while all the start points of the time domain resources may or may not fall within the same multiplexing window.

For example, as shown in FIG. 5, if the granularity of the feedback timing is half slot, the multiplexing window of the granularity for multiplexing feedback information is also half slot. If the end points of the feedback resources of the feedback information PUCCH 2 and PUCCH 3 of PDSCH 2 and PDSCH 3 fall on the same half slot, then the feedback information of PDSCH 2 and PDSCH 3 is multiplexed on a resource associated with PUCCH 3. There are no feedback resources with the same end point in the feedback PUCCH corresponding to PDSCH 1, so the feedback information of the PDSCH is still sent on PUCCH 1. Further, if PUCCH 1 overlaps with PUCCH 3, they may be further multiplexed, or transmitted independently, or it is directly agreed that resources for multiplexing HARQ-ACK cannot cross between half slots to avoid occurrence of a phenomenon of overlap between PUCCH 1 and PUCCH 3.

Scenario Three

The granularity for multiplexing the feedback information is determined. Accordingly, the second processing unit determines that the terminal device multiplexes the feedback information of the at least two downlink transmissions on the same feedback resource when resources for the feedback information of the at least two downlink transmissions overlap partially.

In this scenario, multiplexing rules may be agreed, for example, when the resources overlap partially in the time domain, multiplexing is performed, otherwise the multiplexing is not performed.

The resources overlapping partially may mean that two pieces of downlink feedback information may be multiplexed on the same feedback resource when two resources overlap partially in the time domain. For example, referring to FIG. 6, where if feedback resources PUCCH 2 and PUCCH 3 corresponding to PDSCH 2 and PDSCH 3 overlap to some extent, PUCCH 2 and PUCCH 3 may be multiplexed on the same feedback resource PUCCH 3 to transmit feedback information corresponding to PDSCH 2 and PDSCH 3.

Scenario Four

The granularity for multiplexing the feedback information is determined. Accordingly, the second processing unit acquires a multiplexing threshold value of a transmission resource of the feedback information.

In this scenario, multiplexing rules may also be agreed, for example, an upper limit of HARQ-ACK multiplexing is configured, and dividing and multiplexing of the granularity for multiplexing HARQ-ACK is performed according to actual scheduling situations.

The multiplexing threshold value may be set according to actual situations, for example, it may be set to 2 or greater, which is not exhaustive in the implementation.

After acquiring the multiplexing threshold value of the transmission resource of the feedback information, the second processing unit is further configured to:

when M pieces of feedback information of M downlink transmissions are located in the same transmission resource, with M being an integer greater than or equal to 1; transmit the feedback information respectively if the number M of pieces of corresponding feedback information in the same transmission resource is not greater than the multiplexing threshold value.

For example, when the multiplexing threshold value is 2, there may be two pieces of feedback information in one transmission resource, which may be one slot or half slot; and if 2 is not greater than the multiplexing threshold value, the feedback information is transmitted on the corresponding feedback resources respectively.

Or, when M pieces of feedback information of M downlink transmissions are located in the same transmission resource, with M being an integer greater than or equal to 1; and if the number M of pieces of corresponding feedback information in the same transmission resource is greater than the multiplexing threshold value, the time domain resources of the feedback information are divided based on the multiplexing threshold value to obtain at least two multiplexing windows; in the at least two multiplexing windows, some of the M pieces of feedback information are multiplexed on the same feedback resource respectively.

In this way, the granularity for multiplexing the feedback information can be acquired in advance, which may be half slot for example. Then, assuming that the multiplexing threshold value is 2, when there are three pieces of feedback information in one slot, referring to FIG. 7, when there are feedback resources PUCCH 1, PUCCH 2 and PUCCH 3 corresponding to PDSCH 1, PDSCH 2 and PDSCH 3 in the slot, the transmission resources may be divided based on the granularity for multiplexing the feedback information, i.e., half slot, to obtain two half slots, and then PUCCH 1 and PUCCH 3 are multiplexed on PUCCH 3, and PUCCH 2 may be transmitted separately.

Or, when M pieces of feedback information of M downlink transmissions are located in the same transmission resource, with M being an integer greater than or equal to 1; and if the number M of pieces of corresponding feedback information in the same transmission resource is greater than the multiplexing threshold value, it is determined that the terminal device divides the time domain resources where the M pieces of feedback information are located to obtain the granularity for multiplexing the feedback information.

Further, the time domain resources of the feedback information may be divided based on the multiplexing threshold value to obtain at least two multiplexing windows; in the at least two multiplexing windows, some of the M pieces of feedback information are multiplexed on the same feedback resource respectively.

For example, referring to FIG. 8, assuming that the feedback resources PUCCH 1, PUCCH 2, and PUCCH 3 of PDSCH 1, PDSCH 2, and PDSCH 3 are all in the same half slot resource, the half slot may be split to obtain two ¼ slots, and then PUCCH 1 and PUCCH 3 may be multiplexed on PUCCH 3, and PUCCH 2 may be sent separately.

Scenario Five

The second processing unit determines the granularity for multiplexing of the terminal device by at least one of: service type, high-level configuration and physical layer indication.

Specifically, the granularity for multiplexing is determined according to the service type, and/or the granularity for multiplexing is determined according to the high-level configuration; which granularity for multiplexing is used may be determined by the terminal device itself according to the service type; or the granularity for multiplexing may be determined by configuring the granularity for multiplexing of the high-level configuration using the service type. For example, there may be a corresponding relation between the service type and the granularity for multiplexing of the high-level configuration. For example, for URLLC services, a granularity for multiplexing (2symbol) of the high-level configuration is used, and for eMBB services, a granularity for multiplexing Oslo® of the high-level configuration is used.

The granularity for multiplexing may be determined according to the physical layer indication (explicit or implicit) and the size of the granularity for multiplexing of the high-level configuration. For example, for MCS-C-RNTI scrambled URLLC services, the granularity for multiplexing (2symbol) of the high-level configuration is used, and for C-RNTI scrambled PDCCHeMBB services, the granularity for multiplexing (1 slot) of the high-level configuration is used.

In addition, the physical layer indication also includes: service indication information, PDCCH configuration, etc., e.g., at least one of aggregation level, CORESET and Format, but the implementations are not limit thereto.

The solution provided in the implementation may be applied to low-latency services such as URLLC services. Of course, the low-latency services are not limited to the URLLC services, and may be other low-latency services, which are not exhaustive in the implementation.

It can be seen that by adopting the above solution, the granularity for multiplexing the feedback information can be set such that the multiplexing window for multiplexing the feedback information can be partial of a slot. In this way, latency of the feedback information can be reduced, such that latency requirements can be met, which is more suitable for services sensitive to transmission latency.

Figure 10:
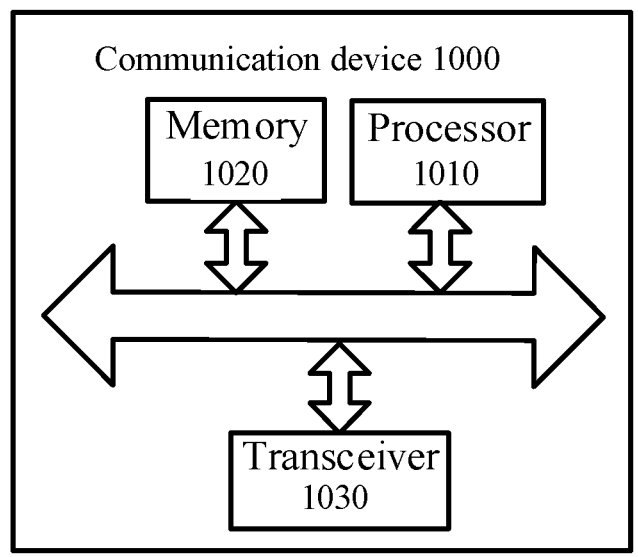
FIG. 10 is a schematic diagram of a structure of a communication device according to an implementation of the present disclosure.

FIG. 10 is a schematic structural diagram of a communication device 1000 according to an implementation of the present application. The communication device may be the aforementioned terminal device or network device of the present implementation. The communication device 1000 shown in FIG. 10 includes a processor 1010, which may call and run a computer program from a memory to implement the methods according to the implementations of the present application.

Optionally, as shown in FIG. 10, the communication device 1000 may further include a memory 1020. The processor 1010 may call and run the computer program from the memory 1220 to implement the methods according to the implementations of the present application.

In the above, the memory 1020 may be a separate device independent of the processor 1010 or may be integrated in the processor 1010.

Optionally, as shown in FIG. 10, the communication device 1000 may further include a transceiver 1030. The processor 1010 may control the transceiver 1030 to communicate with other devices. Specifically, the transceiver 1030 may send information or data to other devices or receive information or data sent by other devices.

In the above, the transceiver 1030 may include a transmitter and a receiver. The transceiver 1030 may further include antennas, wherein the number of the antennas may be one or more.

Optionally, the communication device 1000 may specifically be the network device according to the implementations of the present application, and the communication device 1000 may implement the corresponding processes implemented by the network device in various methods according to the implementations of the present application, which will not be repeated here for brevity.

Optionally, the communication device 1000 may specifically be the terminal device or the network device according to the implementations of the present application, and the communication device 1000 may implement the corresponding processes implemented by the mobile terminal/terminal device in various methods according to the implementations of the present application, which will not be repeated here for brevity.

Figure 11:
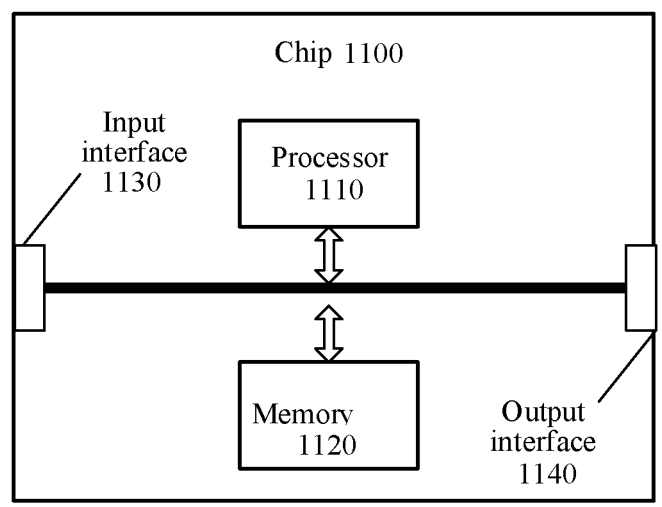
FIG. 11 is a schematic block diagram of a chip according to an implementation of the present application.

FIG. 11 is a schematic structural diagram of a chip according to an implementation of the present application. The chip 1100 shown in FIG. 11 includes a processor 1110. The processor 1110 may call and run a computer program from a memory to implement the methods according to the implementations of the present application. Optionally, as shown in FIG. 11, the chip 1100 may further include a memory 1120. The processor 1110 may call and run the computer program from the memory 1120 to implement the methods according to the implementations of the present application.

In the above, the memory 1120 may be a separate device independent of the processor 1110 or may be integrated in the processor 1110.

Optionally, the chip 1100 may further include an input interface 1130. The processor 1110 may control the input interface 1130 to communicate with other devices or chips. Specifically, the processor 1110 may acquire information or data sent by other devices or chips.

Optionally, the chip 1100 may further include an output interface 1140. The processor 1110 may control the output interface 1140 to communicate with other devices or chips. Specifically, the processor 1110 may output information or data to other devices or chips.

Optionally, the chip may be applied to the network device in the implementations of the present application, and the chip may implement the corresponding processes implemented by the network device in various methods according to the implementations of the present application, which will not be repeated here for brevity.

Optionally, the chip may be applied to the terminal device in the implementations of the present application, and the chip may implement the corresponding processes implemented by the terminal device in various methods according to the implementations of the present application, which will not be repeated here for brevity.

It should be understood that the chip mentioned in the implementations of the present application may be referred to as a system-level chip, a system chip, a chip system or a system-on-chip, etc.

Figure 12:
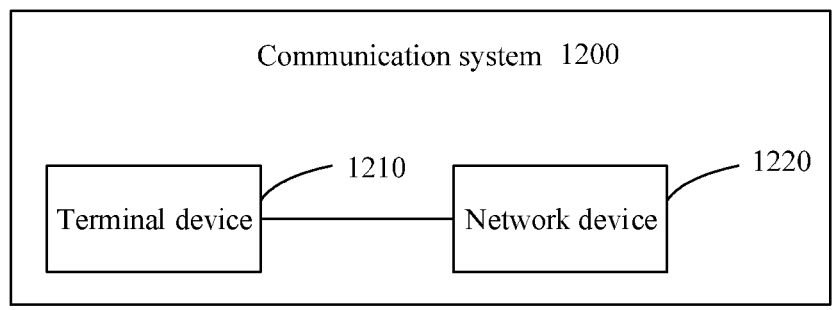
FIG. 12 is a second schematic diagram of an architecture of a communication system according to an implementation of the present application.

FIG. 12 is a schematic block diagram of a communication system 1200 according to an implementation of the present application. As shown in FIG. 12, the communication system 1200 includes a terminal device 1210 and a network device 1220.

In the above, the terminal device 1210 may be used for implementing the corresponding functions implemented by the terminal device in the above-mentioned methods, and the network device 1220 may be used for implementing the corresponding functions implemented by the network device in the above-mentioned methods, which will not be repeated here for brevity.

It should be understood that the processor in the implementation of the present application may be an integrated circuit chip having a signal processing capability. In an implementation process, the acts of the foregoing method implementations may be implemented through an integrated logic circuit of hardware in the processor or instructions in a form of software. The processor described above may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform various methods, acts and logical block diagrams disclosed in the implementations of the present application. The general purpose processor may be a microprocessor, or the processor may also be any conventional processor, or the like. The acts of the methods disclosed in the implementations of the present application may be directly embodied to be implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, or a register. The storage medium is located in the memory, and the processor reads information in the memory and completes the acts of the foregoing methods in combination with its hardware.

It may be understood that the memory in the implementations of the present application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but not restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but not be limited to, these and any other suitable types of memories.

It should be understood that the foregoing memory is described in an exemplary but non-limiting sense. For example, the memory in the implementations of the present application may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present application is intended to include, but not be limited to, these and any other suitable types of memories.

An implementation of the present application further provides a computer readable storage medium configured to store a computer program.

Optionally, the computer readable storage medium may be applied to the network device in the implementations of the present application, and the computer program causes a computer to perform the corresponding processes implemented by the network device in various methods according to the implementations of the present application, which will not be repeated here for brevity.

Optionally, the computer readable storage medium may be applied to the terminal device in the implementations of the present application, and the computer program causes the computer to perform the corresponding processes implemented by the mobile terminal/terminal device in various methods according to the implementations of the present application, which will not be repeated here for brevity.

An implementation of the present application further provides a computer program product including computer program instructions.

Optionally, the computer program product may be applied to the network device in the implementations of the present application, and the computer program instructions cause a computer to perform the corresponding processes implemented by the network device in various methods according to the implementations of the present application, which will not be repeated here for brevity.

Optionally, the computer program product may be applied to the mobile terminal/terminal device in the implementations of the present application, and the computer program instructions cause the computer to perform the corresponding processes implemented by the mobile terminal/terminal device in various methods according to the implementations of the present application, which will not be repeated here for brevity.

An implementation of the present application further provides a computer program.

Optionally, the computer program may be applied to the network device in the implementations of the present application. The computer program, when being run on a computer, causes the computer to perform the corresponding processes implemented by the network device in various methods according to the implementations of the present application, which will not be repeated here for brevity.

Optionally, the computer program may be applied to the mobile terminal/terminal device in the implementations of the present application. The computer program, when being run on a computer, causes the computer to perform the corresponding processes implemented by the mobile terminal/terminal device in various methods according to the implementations of the present application, which will not be repeated here for brevity.

A person of ordinary skill in the art may recognize that the elements and algorithm acts in various examples described in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions for each particular application, but such implementation should not be considered to be beyond the scope of the present application.

Those skilled in the art may clearly understand that for the sake of convenience and conciseness of description, the specific working processes of the systems, devices and units described above may be described with reference to the corresponding processes in the above method implementations and will not be repeated herein.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. In addition, the shown or discussed coupling or direct coupling or communication connection between each other may be an indirect coupling or communication connection through some interfaces, devices or units, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present application may be integrated into one processing unit, or may exist physically separately, or two or more than two units may be integrated into one unit.

The function, if implemented in a form of software functional unit and sold or used as an independent product, may be stored in a computer readable storage medium. Based on such understanding, the technical solution of the present application, in essence, or the part contributing to the prior art, or the part of the technical solution, may be embodied in the form of a software product, which is stored in a storage medium, and includes several instructions for causing a computer device (which may be a personal computer, a server, or a network device, etc.) to perform all or part of the acts of various implementations of the present application. The aforementioned storage medium includes various media, such as a U disk, a mobile hard disk, a read-only memory (ROM), a random access memory (RAM), a magnetic disk, or an optical disk, which are capable of storing program codes What are described above are merely example implementations of the present application, but the protection scope of the present application is not limited thereto. Any variation or substitution that may easily occur to a person skilled in the art within the technical scope disclosed by the present application shall be included within the protection scope of the present application. Therefore, the protection scope of the present application shall be subject to the protection scope of the claims.

What is claimed is:

1. A method for multiplexing on a feedback resource, which is applied to a terminal device and comprises:
    determining a granularity for multiplexing feedback information, wherein the granularity for multiplexing represents a time domain range of a multiplexing window for multiplexing the feedback information; and
    multiplexing feedback information of at least two downlink transmissions on a same feedback resource in the multiplexing window; the time domain range is one of: partial of a slot or N symbols, with N being an integer greater than or equal to 1;
    wherein the granularity for multiplexing the feedback information is the same as a granularity of a feedback timing, wherein the granularity of the feedback timing is one of: partial of the slot or N symbols, with N being an integer greater than or equal to 1.

2. The method of claim 1, wherein multiplexing the feedback information of the at least two downlink transmissions on the same feedback resource in the multiplexing window comprises:
    multiplexing the feedback information of the at least two downlink transmissions on the same feedback resource when the feedback information of the at least two downlink transmissions correspond to a same multiplexing window.

3. The method of claim 2, wherein the feedback information of the at least two downlink transmissions correspond to a same multiplexing window comprises:
    start points or end points of time domain resources of the feedback information of the at least two downlink transmissions being located in the same multiplexing window.

4. The method of claim 2, further comprising:
    multiplexing the feedback information of the at least two downlink transmissions located in different multiplexing windows on the same feedback resource, when resources for feedback information of the at least two downlink transmissions located in different multiplexing windows overlap partially.

5. The method of claim 1, wherein the granularity for multiplexing is determined according to at least one of:
    a type of service, a high-level configuration and a physical layer indication.

6. A method for multiplexing on a feedback resource, which is applied to a network device and comprises:
    determining a granularity for multiplexing feedback information, wherein the granularity for multiplexing represents a time domain range of a multiplexing window for multiplexing the feedback information, feedback information of at least two downlink transmissions are multiplexed on a same feedback resource in the multiplexing window and the time domain range is one of: partial of a slot or N symbols, with N being an integer greater than or equal to 1; and determining feedback information of at least two downlink transmissions transmitted and multiplexed by a terminal device on the same feedback resource in the multiplexing window based on the granularity for multiplexing the feedback information;

wherein the granularity for multiplexing the feedback information is the same as a granularity of a feedback timing, wherein the granularity of the feedback timing is one of: the slot, partial of the slot or N symbols, with N being an integer greater than or equal to 1.

7. The method of claim 6, wherein determining feedback information of the at least two downlink transmissions on the same feedback resource comprises:

determining that the feedback information of the at least two downlink transmissions are multiplexed by the terminal device on the same feedback resource when the feedback information of the at least two downlink transmissions correspond to a same multiplexing window.

8. The method of claim 7, wherein the feedback information of the at least two downlink transmissions correspond to a same multiplexing window comprises:

start points or end points of time domain resources of the feedback information of the at least two downlink transmissions being located in the same multiplexing window.

9. The method of claim 7, further comprising:

determining the feedback information of the at least two downlink transmissions located in different multiplexing windows are multiplexed by the terminal on the same feedback resource, when resources for feedback information of the at least two downlink transmissions located in different multiplexing windows overlap partially.

10. A terminal device comprising a processor, a memory, and transceiver, wherein the memory is configured to store a computer program, the transceiver is configured to communicate with other devices under control of the processor, and the processor is configured to run the computer program from the memory to:

determine a granularity for multiplexing feedback information, wherein the granularity for multiplexing represents a time domain range of a multiplexing window for multiplexing the feedback information; and multiplex feedback information of at least two downlink transmissions on a same feedback resource in the multiplexing window; the time domain range being one of: partial of a slot or N symbols, with N being an integer greater than or equal to 1;

wherein the granularity for multiplexing the feedback information is the same as a granularity of a feedback timing, wherein the granularity of the feedback timing is one of: the slot, partial of the slot or N symbols, with N being an integer greater than or equal to 1.

11. The terminal device of claim 10, wherein the processor is configured to run the computer program from the memory to: multiplex the feedback information of the at least two downlink transmissions on the same feedback resource when the feedback information of the at least two downlink transmissions correspond to a same multiplexing window.

12. The terminal device of claim 11, wherein the feedback information of the at least two downlink transmissions corresponding to a same multiplexing window comprises: start points or end points of time domain resources of the feedback information of the at least two downlink transmissions being located in the same multiplexing window.

13. The terminal device of claim 11, wherein the processor is configured to run the computer program from the memory to: multiplex the feedback information of the at least two downlink transmissions located in different multiplexing windows on the same feedback resource when resources for feedback information of the at least two downlink transmissions located in different multiplexing windows overlap partially.

14. A network device comprising a processor, a memory, and transceiver, wherein the memory is configured to store a computer program, the transceiver is configured to communicate with other devices under control of the processor, and the processor is configured to run the computer program from the memory to:

determine a granularity for multiplexing feedback information, wherein the granularity for multiplexing represents a time domain range of a multiplexing window for multiplexing the feedback information; and feedback information of at least two downlink transmissions are multiplexed on a same feedback resource in the multiplexing window; and the time domain range is one of: partial of a slot or N symbols, with N being an integer greater than or equal to 1; and determine feedback information of the at least two downlink transmissions transmitted and multiplexed by a terminal device on the same feedback resource in the multiplexing window based on the granularity for multiplexing the feedback information;

wherein the granularity for multiplexing the feedback information is the same as a granularity of a feedback timing, wherein the granularity of the feedback timing is one of: the slot, partial of the slot or N symbols, with N being an integer greater than or equal to 1.

15. The network device of claim 14, wherein the processor is configured to run the computer program from the memory to: determine that the feedback information of the at least two downlink transmissions are multiplexed by the terminal device on the same feedback resource when the feedback information of the at least two downlink transmissions correspond to a same multiplexing window.

16. The network device of claim 15, wherein the feedback information of the at least two downlink transmissions corresponding to a same multiplexing window comprises:

start points or end points of time domain resources of the feedback information of the at least two downlink transmissions being located in the same multiplexing window.

17. The network device of claim 15, wherein the processor is configured to run the computer program from the memory to: determine the feedback information of the at least two downlink transmissions located in different multiplexing windows are multiplexed by the terminal on the same feedback resource on the same feedback resource, when resources for feedback information of the at least two downlink transmissions located in different multiplexing windows overlap partially.

* * * * *